Figure 1:
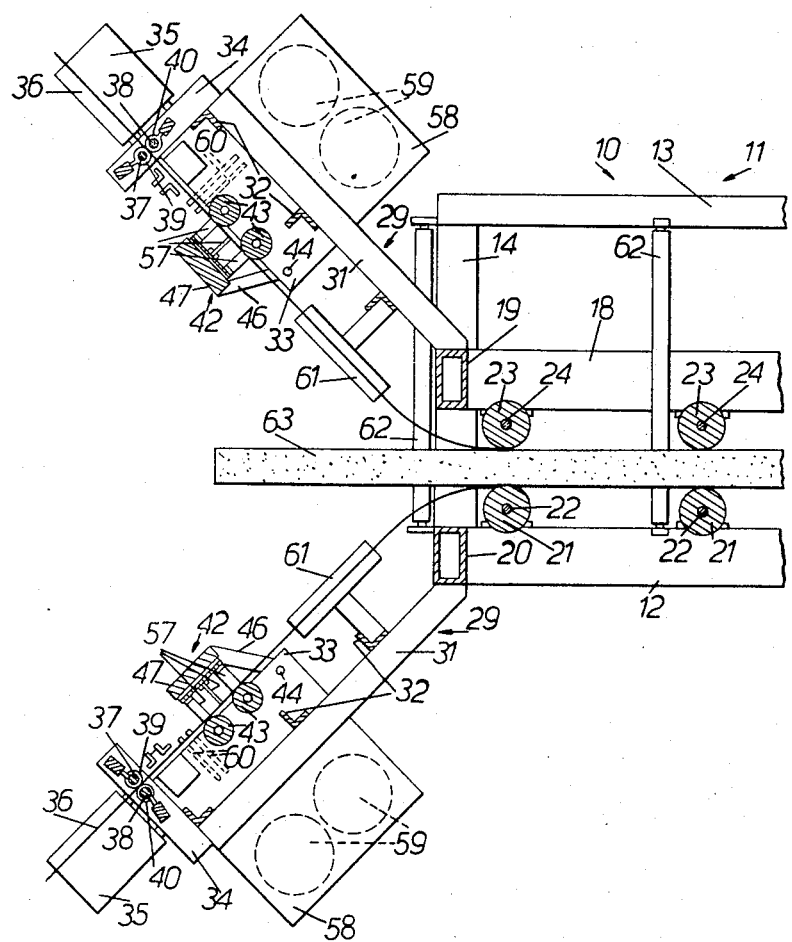

United States Patent [19]
Rudnev

[11] 3,773,600
[45] Nov. 20, 1973

[54] MANUFACTURE OF STRUCTURAL UNITS
[76] Inventor: Michael John Rudnev, 96 Rome St., Brisbane, Australia
[22] Filed: Mar. 14, 1972
[21] Appl. No.: 234,500

[52] U.S. Cl. ............................... 156/551, 156/324
[51] Int. Cl. ............................................. B32b 31/04
[58] Field of Search ................... 156/543, 547, 548, 156/549, 551, 555, 324

[56] References Cited
UNITED STATES PATENTS

| | | | |
|---|---|---|---|
| 3,159,514 | 12/1964 | McKnight et al. | 156/547 X |
| 3,490,977 | 1/1970 | Lincoln | 156/548 X |
| 3,650,871 | 3/1972 | Bentfors | 156/269 |

Primary Examiner—William A. Powell
Attorney—Oberlin, Maky, Donnelly & Rener

[57] ABSTRACT

Apparatus for making a laminated panel with skins of sheet material adhesively secured to a core advances the core in vertical disposition and conveys the skins to and advances them adjacently with the core; and an adhesive applicator applies adhesive to one of each pair of skin and core surfaces to be adhered before the skins meet the core, the applicator including nozzles to direct fluid adhesive onto the upper part of said surface, a plurality of flexible fingers and means for reciprocating the fingers in sequence between the upper and lower parts of said surface.

4 Claims, 7 Drawing Figures

Patented Nov. 20, 1973 3,773,600

3 Sheets-Sheet 1

MANUFACTURE OF STRUCTURAL UNITS

This invention relates to the manufacture of structural units.

Panels for the construction of cold rooms and other buildings are commonly of laminated or "sandwich" type, made of an inner section or core of expanded polystyrene or other heat-insulating material with skins of sheet metal or other relatively thin sheet material secured adhesively to both sides. Such a panel is usually made by applying adhesive to the appropriate surfaces of the skins and/or of the central insulating section after which a skin is superimposed on the expanded polystyrene section which in turn is superimposed on the other skin the assembly being subjected to pressure in a press. Consequently, the size of the panel produced is limited by the size of the press available.

One of the objects of the present invention is to provide apparatus for producing laminated panels, of the general type set out, simply and economically, the apparatus lending itself to the production of such panels in considerably greater lengths than has been practical by means of a press as described. Other objects attainable in preferred embodiments of the invention are to provide apparatus for the continuous production of such laminated units, to any desired length and, if required, to a predetermined curvature and the apparatus being particularly compact and readily capable of being transported and therefore capable of producing the panels at the site on which they are required to be used, so that very large units, for the more economical construction of cold rooms or other buildings may be made without the limitations imposed by problems of transport from factory to site.

With the foregoing and other objects in view, the invention resides broadly, in apparatus for making a laminated panel of an inner core and outer skins adhesively secured to the substantially parallel sides of the core section, including means for advancing a core section in substantially vertical disposition; means for conveying outer skin sections to and advancing them adjacently with the inner core section; an adhesive applicator for applying adhesive to one of each pair of surfaces of core and skin to be adhesively secured before the skins are brought to the core section, and means for pressing the two skins firmly to the core. Preferably the means for pressing the skin to the core are driven substantially vertical pressure rollers; and preferably means are provided for the controlled heating of the adjacent sections.

Figure 2:
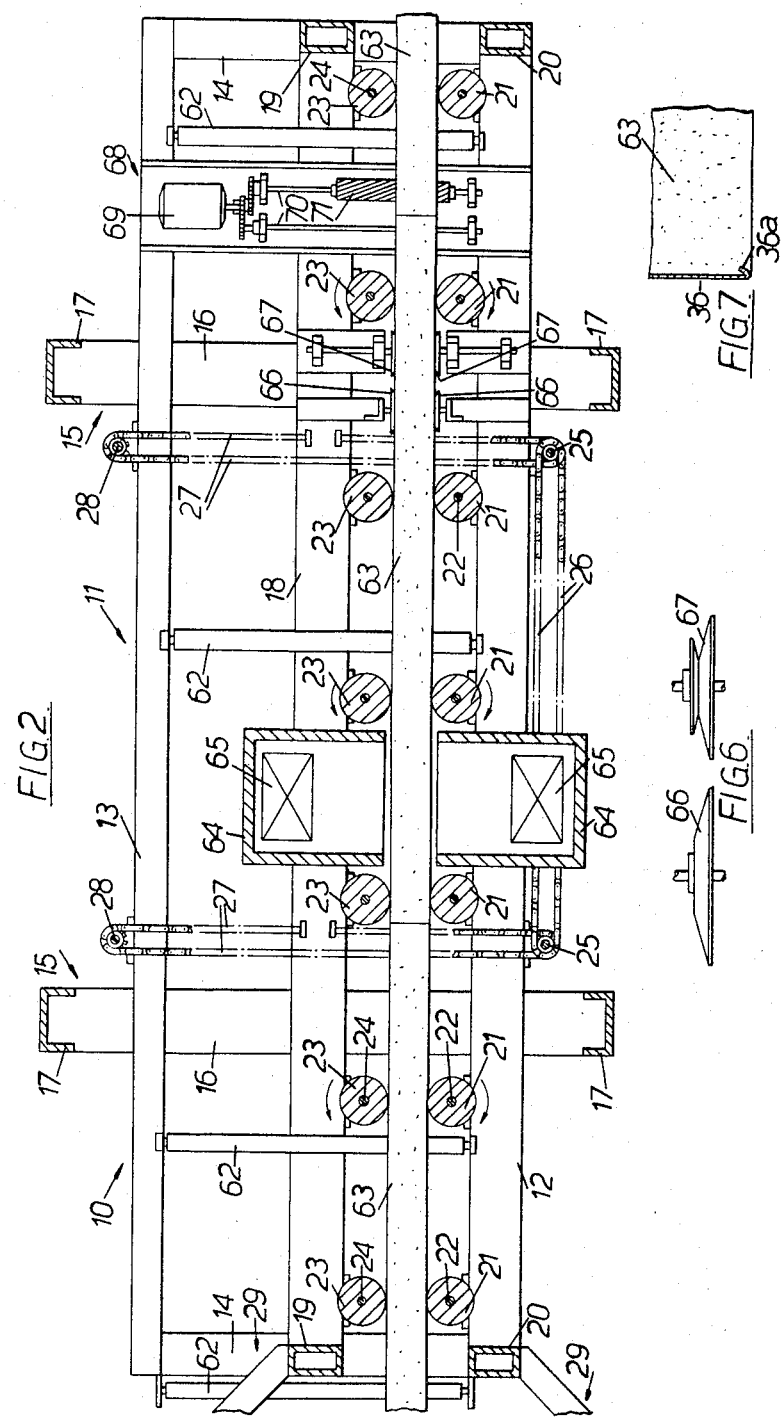
Figure 3:
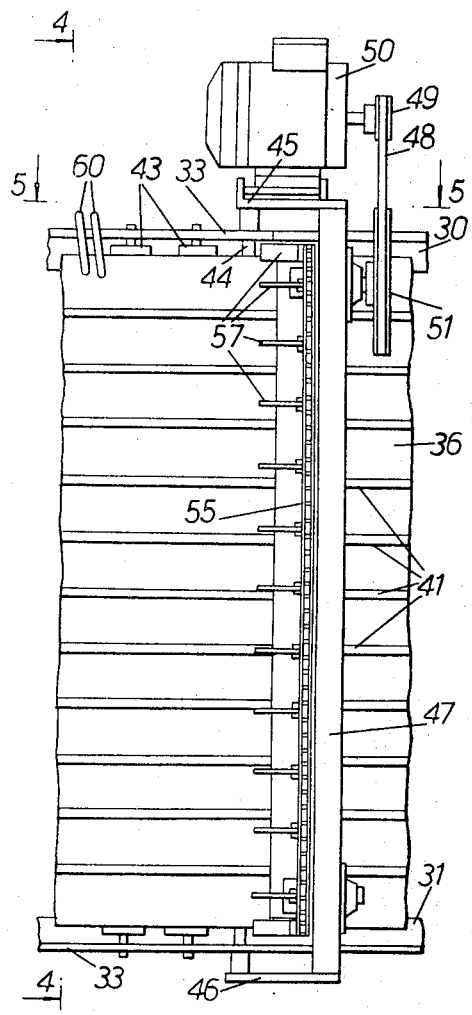
Figure 4:
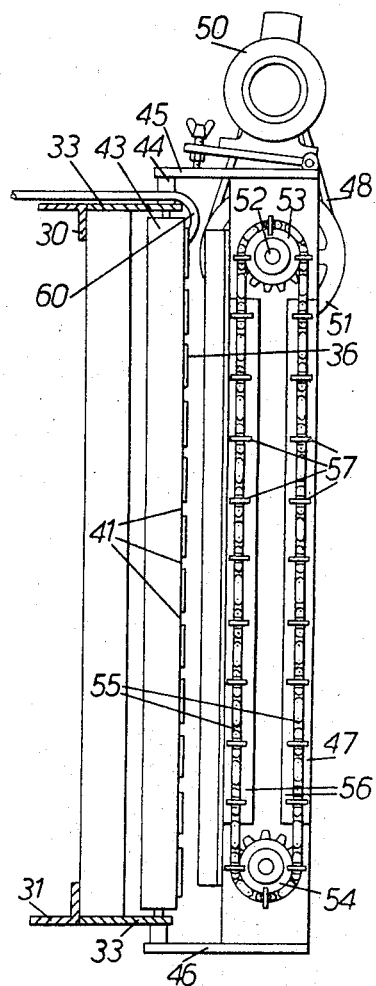
Figure 5:
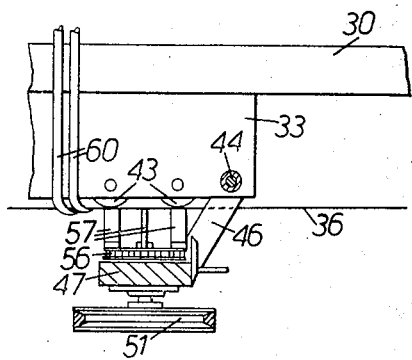

In the drawings:

FIG. 1 is a sectional plan view of the rear part of apparatus according to the invention, and including the rear frames secured to the rear part of the main frame, FIG. 2 is a view similar to FIG. 1 of the main frame of the apparatus to which the rear frames are secured, FIG. 3 is a side elevational view to enlarged scale, of the adhesive applicator, in inoperative position, FIG. 4 is a sectional view along line 4—4 in FIG. 3, FIG. 5 is a sectional view along line 5—5 in FIG. 3, the adhesive applicator being moved to operative position, FIG. 6 is a detail plan view, to enlarged scale, of edge straightening wheels of the apparatus, and FIG. 7 is a sectional view of part of a panel with an edge of a skin thereof inturned by edge straightening wheels of the apparatus.

The apparatus includes a main frame 10, shown particularly in FIG. 2, and which has a bottom sub-frame 11 and, mounted above it, a generally similar top sub-frame not shown in the drawings. Each of these sub-frames consists mainly of two side members 12 and 13, rigidly interconnected by end members 14. The two sub-frames are supported in parallel relationship, one above the other, by a pair of transverse rectangular mounting frames 15, each consisting of a bottom member 16 secured under the bottom sub-frame 11, a pair of standards 17 extending upwardly from the ends of the said bottom member, and a top member (not shown) similar to the bottom member and secured across the top of the top sub-frame.

Associated with each of the bottom sub-frame 11 and the top sub-frame is a longitudinal member 18 which is mounted for transverse movement in parallelism being mounted on travellers or rollers (not shown) for example. Uprights 19 rigidly interconnect the ends of the movable longitudinal members 18 of the bottom and top sub-frames, and similar uprights 20 interconnect the ends of the side members 12 of the bottom sub-frame 11 and the top sub-frame.

A series of equally spaced vertical resilient pressure rollers 21 have shafts 22 carried by bearings on the side members 12 of the bottom and top sub-frames, and a series of corresponding similar pressure rollers 23 on shafts 24 are rotatable in bearings in the movable longitudinal members 18 of the bottom and top sub-frames. The shafts 22 and 24 of all of these rollers 21 and 23 are driven by chain or any other suitable drives from a power source (not shown) mounted on the main frame 10, the rollers 21 being rotated in opposite direction to the rollers 23, in the directions indicated by arrows in FIG. 2.

To move the pressure rollers 23 towards or away from the corresponding pressure rollers 21, a manually operated hydraulic device (not shown) on the top sub-frame is adapted to drive, in one direction or the other, either one of a pair of vertical shafts 25 rotatable in bearings on the side members 12 of the top and bottom sub-frames, these shafts being interconnected, at top and bottom, by sprocket and chain connections 26. In each of the top and bottom sub-frames, two chain and tension rod connections 27 are at one end made fast to the movable longitudinal member 18, are carried around idler sprockets 28 on the side member 13, back around sprockets on the shafts 25, and at their other end are made fast to the movable longitudinal member 18. Thus by causing the interconnected shafts 25 to be rotated in one direction or the other, the movable longitudinal members 18 of the top and bottom sub-frames are moved in parallelism away from or towards the side members 12 of these sub-frames.

To each of the rear uprights 19 and 20 there are secured a pair of rear frames 29, which are oppositely arranged but otherwise similar, and which, as shown particularly in FIG. 1, are secured to these uprights obliquely so as to diverge rearwardly. Each of the rear frames has a pair of parallel top and bottom arms 30 and 31 respectively which are interconnected by uprights 32. Each of the arms 30 and 31 has a horizontal plate 33 extending from it, and has secured perpendicularly across its end a horizontal bracket 34. Mounted in vertically adjustable manner on each of the brackets 33 is a horizontal guide plate 35.

From a pair of rolls (not shown) of sheet metal, supported rotatably in any suitable way with their axes vertical, lengths of sheet metal, as shown at 36, are fed between the upper and lower guide plates 35 of both rear frames 29. Each length of sheet metal 36 is fed through a forming assembly of known type, and consisting of a pair of fixed upright shafts 37 and 38 mounted between the brackets 34, shaft 37 having a number of pairs of annular rollers 39 rotatable thereon, shaft 38 having a like number of single annular rollers 40, the rollers 39 and 40 being adapted to form a series of equally spaced shallow grooves 41, as shown in FIGS. 3 and 4, in the sheet metal.

The sheet metal is fed, from the forming rollers, to an adhesive applicator assembly, indicating generally at 42, and including a pair of vertical backing rollers 43 rotatably mounted between the top and bottom plates 33 of the side frame. From the top and bottom of a shaft 44 rotatably mounted in these plates 33, there extend a pair of brackets 45 and 46 secured to the top and bottom of a vertical applicator base plate 47. A belt drive 48 from the pulley 49 of a motor 50 mounted adjustably above the top bracket 45 drives a pulley 51 on one end of a shaft 52 rotatable in bearings in the upper part of the base plate 47 and has a sprocket 53 on its other end. An idler sprocket 54 is mounted on the lower part of the applicator frame member 47, and an endless chain 55 is engaged with the two sprockets 53 and 54, passing over rubbing plates 56 on the frame member. These plates 56 may be grooved to receive parts of the chain and so serve as guides between the sprockets.

A series of resiliently flexible fingers 57 are secured on the chain 55 in equally spaced arrangement, and may be strips of rubber or a suitable plastic material, arranged to extend from the chain in substantially parallel arrangement. The parts are so made and arranged that when the applicator is swung hingedly to inoperative position, as shown in FIGS. 3 and 4, the fingers 57 are well clear of the sheet metal 36, which is in contact with the backing rollers 43, but when the applicator is swung through about a right angle to operative position, as shown in FIG. 5, the fingers bear against the sheet metal. Any suitable means (not shown) may be provided for releasably holding the applicator in operative position.

The adhesive applied to the sheet metal is preferably of the type consisting of two liquid components, being an epoxy resin and a catalyst. From the lower arm 32 of each rear frame 29, a support plate 58 extends to carry tanks, indicated at 59, for the two liquid components of the adhesive. Any suitable means (not shown) are provided for directing liquid from these tanks through flexible lines (not shown) to a pair of nozzles 60 mounted on the top arm 30 and top plate 33 of the rear frame, and extending downwardly and shaped to be adapted to direct the liquid close onto the sheet metal 36 near to its upper edge, and a short distance behind the applicator.

From the adhesive applicator of each rear frame 29, the sheet metal is fed over a bearer plate 61, and to the main frame 10.

The main frame 10 is provided with a series of transverse support rollers 62 mounted above the bottom sub-frame 12, and under the similar top sub-frame. The sheet metal 36 from the two rolls is fed between the top and bottom transverse rollers, and between vertical pressure rollers 21 and 23; and core sections 63 of expanded polystyrene or the like are fed between the two skins of sheet metal.

The hydraulic apparatus is operated so that the feed rollers 23 are moved to cause firm pressure to be applied by rollers 21 and 23 to the laminated arrangement of sheet metal skins 36 and central core section 63.

When the apparatus is in operation, the pressure rollers 21 and 23 are driven to cause the laminated arrangement to be advanced through the main frame. The sheet metal 36 is drawn from the two rolls, through the forming assembly to have the grooves 41 formed therein, and through the adhesive applicator assembly 42. At the applicator, the liquid components of the adhesive are ejected from the nozzles 60, fairly close together, and near to the top edge of the sheet metal 36. The applicator fingers 57 mix together the liquid components, carrying the mixture down the sheet metal to a position near to the bottom edge, and then, the applicator chain 55 passing around the idler sprocket 54, carry the adhesive mixture up near to the top edge of the sheet metal, and so on. In this way, a substantially even layer of thoroughly mixed adhesive is applied to the vertical sheet metal as it is drawn through the assembly.

As the adhesive-coated sheet metal skins enter the main frame 10, they are pressed firmly against the sides of the interposed core section 63 by the first of the pairs of pressure rollers 21 and 23, and by subsequent pairs of pressure rollers, so that the adhesive applied to the skins is squeezed onto the interposed core section, which, being soft and compressible, is deformed slightly by the pressed-in grooves 41 of the skin sections.

When the assembly of core and skins has proceeded for some distance through the main frame it is subjected to controlled heat, the assembly passing between two heater housings 64, one mounted between the side members 12, the other between the laterally movable members 18, of the top and bottom sub-frames. Within both of these housings are heater assemblies indicated at 65, including blowers for directing air past heating elements, which may be thermostatically controlled, and onto both sides of the laminated assembly passing between the housings.

The formulation of the adhesive used is such that when the sheet metal skins 36 are first brought into contact with the insulating core 63 the adhesive mixed and spread on the sheet metal will transfer readily to the core; and when the panel being formed is passed at controlled speed and controlled temperature through the apparatus, the reaction of the adhesive components will so advance that the adhesive will become sufficiently viscous and tacky for the skins to be caused by the pressure applied by the pressure rollers to hold firmly to the central core.

Although the skins 36 are passed between the transverse rollers 62 of the top and bottom sub-frames of the main frame, there is the possibility that either one of them may travel with such minor variations that an edge may extend slightly above or below the desired level. In order that the edges of the panel will be true despite any such variations there are provided, on the top and bottom sub-frames, edge straightening wheels, as shown particularly in FIG. 6. These comprise, for each longitudinal edge of each skin 36, a guide wheel 66 and a shaping wheel 67 on lateral shafts, the guide wheel being of frusto-conical shape, the shaping wheel being in the form of two oppositely arranged co-axial frusto-conical parts. The top and the bottom parts of the advancing laminated assembly pass between two oppositely arranged guide wheels 66, which press the edge portions of the sheet metal skins firmly to the intermediate insulating core section, and then each of the top and bottom edges of skin 36 passes through the small-angle made by the two parts of the shaping wheel 67. Should an edge of the skin 36 extend appreciably beyond the required level, it will be inturned, as shown in FIG. 7 at 36a.

The laminated assembly is then passed between trimming assemblies 68 on the top and bottom sub-frames, each including a motor 69 driving a pair of transverse shafts 70. One of these shafts carries a rotary planer 71 for removing any excess from the insulating core section 63, the other shaft 70 may be fitted with groove cutters (not shown) for forming grooves in the longitudinal edges of the core.

As the laminated assembly is ejected from the main frame 10 in the form of a sandwich type panel, it is supported in any suitable manner. Whereas to support such an assembly formed horizontally would require a fairly extensive conveyor system, the panel when formed vertically as described requires little support. A fairly small wheel-mounted support placed under the leading part of the panel, with a level surface to travel on, will generally suffice to support a very considerable length of panel. Alternatively, small rollers may be provided at fairly large intervals to support the advancing panel; or the panel may be supported by a fairly smooth level surface which may be the foundation or footing on which the panel is required to be erected as a wall or part of a wall.

In some cases it may be required to make panels having some curvature, for example to serve as prestressed roof sections. In this event, the pressure rollers, or certain of them, may be adjusted appropriately to impart such curvature.

The apparatus may be of such size that it may be readily transported to a site on which panels made by the apparatus are required to be erected to form a cold-room or other building. Thus, there may be made, at the site, very long panels, to facilitate greatly the erection of a building, but which could not be transported to the site from a distant factory. It will be appreciated that the rolls of sheet metal may be easily transported, and the insulating material forming the central section is made in such lengths as to be conveniently transportable. For mobility, the main frame 10 may be mounted on wheels (not shown) and capable of being supported by jacks (not shown) when brought to the required position. The rear frames 29 may be made detachable or hingedly connected to the main frame so that they may be swung forwardly to the main frame for transport.

Although the apparatus as described and illustrated will be found to be very effective in achieving the objects for which it has been devised, it will, of course, be understood that many modifications of constructional detail and design may be made within the scope of the invention as hereinafter claimed.

What I claim is:

1. Apparatus for making a laminated panel with an inner core section and outer skins of sheet material adhesively secured to the substantially parallel side faces of the core including means for advancing the inner section in substantially vertical disposition; means for conveying the skins to and advancing them adjacently with the core; an adhesive applicator for applying adhesive to one of each pair of surfaces of skin and core to be adhesively secured together before the skins are brought adjacent to the core, such adhesive applicator consisting of means for directing fluid adhesive onto the upper part of said surface, a plurality of flexible fingers, and means for reciprocating the said fingers sequentially between the upper and lower parts of the said surface; and means for passing the two skins to the core.

2. Apparatus according to claim 1 wherein the flexible fingers are mounted on and extend in substantially parallel arrangement from a sprocket-mounted endless chain means being provided for driving the said chain.

3. Apparatus according to claim 2 wherein the sprocket-mounted endless chain is mounted on a base member movable to operative position, the fingers contacting the said surface, or to inoperative position, the fingers clear of the said surface.

4. Apparatus according to claim 1 wherein the means for advancing the outer sections and interposed inner section, and for pressing the outer sections to the inner section, include a series of resilient substantially vertical pressure rollers, fixedly mounted on a main frame, and a series of corresponding resilient substantially vertical pressure rollers laterally adjustably mounted on the main frame, a drive for counter-rotating the said pressure rollers of the two series and means for moving the adjustable pressure rollers towards or from said fixed pressure rollers.

* * * * *